Jan. 2, 1934. E. C. FINK 1,941,673
STEERING AND STABILIZING CONSTRUCTION FOR INDIVIDUALLY SPRUNG WHEELS
Filed July 26, 1932 2 Sheets-Sheet 1
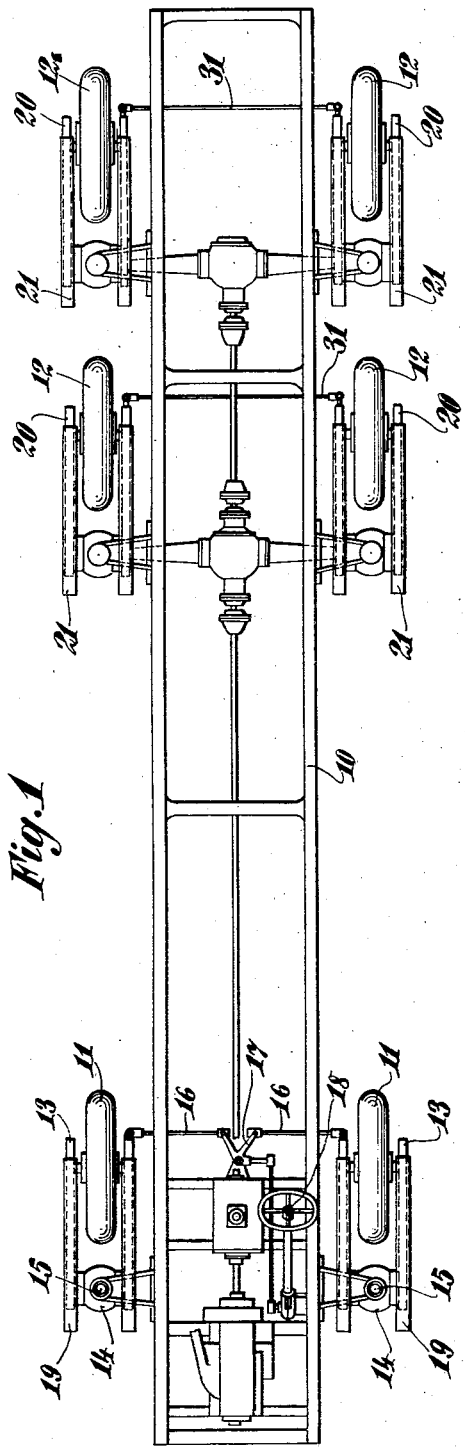
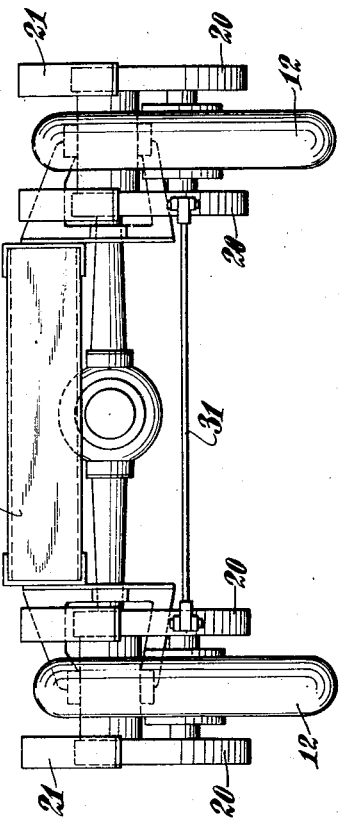
INVENTOR
*Emil C. Fink*,
BY Redding, Greeley, O'Shea & Campbell
HIS ATTORNEYS Jan. 2, 1934.　　　　E. C. FINK　　　1,941,673
STEERING AND STABILIZING CONSTRUCTION FOR INDIVIDUALLY SPRUNG WHEELS
Filed July 26, 1932　　2 Sheets-Sheet 2
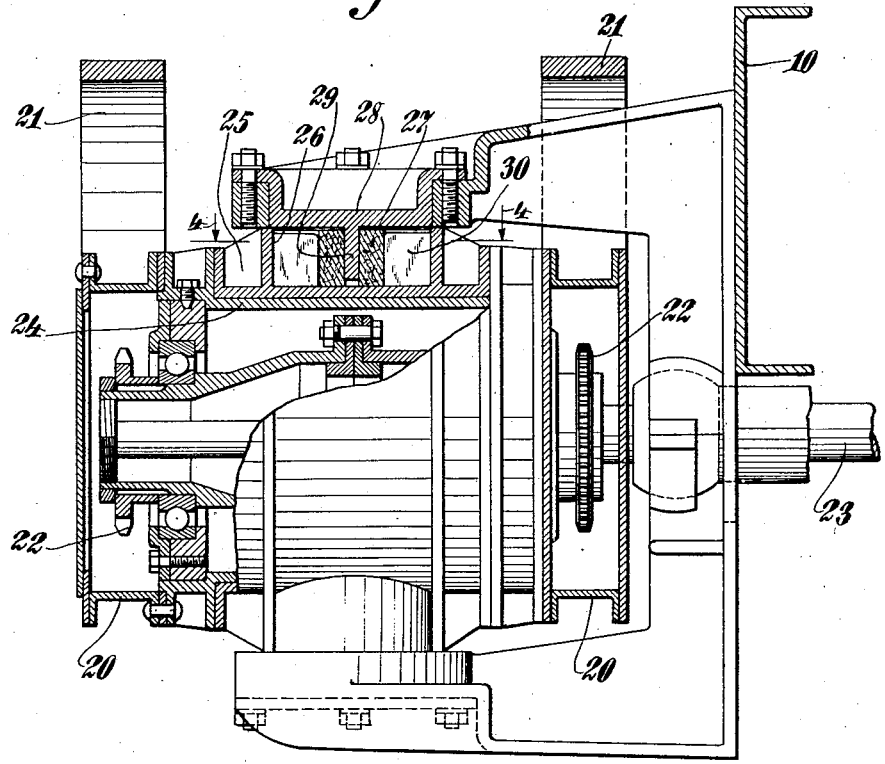
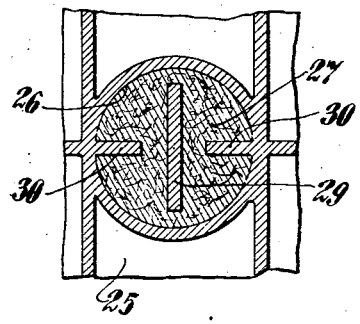
INVENTOR
Emil C. Fink,
HIS ATTORNEYS Patented Jan. 2, 1934

1,941,673

UNITED STATES PATENT OFFICE 1,941,673

STEERING AND STABILIZING CONSTRUCTION FOR INDIVIDUALLY SPRUNG WHEELS

Emil C. Fink, New York, N. Y., assignor to International Motor Company, New York, N. Y., a corporation of Delaware Application July 26, 1932. Serial No. 624,689

1 Claim. (Cl. 180—1)

The present invention relates to motor vehicles and embodies, more specifically, an improved motor vehicle construction wherein the frame is supported upon a plurality of independently sprung wheels. More specifically, the invention embodies an improved wheel mounting construction wherein forward and rear independently mounted wheels are provided upon a motor vehicle frame, the forward wheels being actuated by a suitable steering mechanism while the rear wheels are independently mounted upon the vehicle frame with provision for a degree of motion thereof in horizontal planes, the said rear wheels being connected by a stabilizing mechanism which enables the same to be moved in unison to effectively trail during operation of the motor vehicle.

The advantages of independently mounted wheels are now generally known and considerable investigation and development has been done in connection therewith particularly in the mechanism by means of which such wheels are mounted upon a motor vehicle frame not only to trail as idle wheels but to serve as driving wheels. The specific elements of such mounting means forms no part of the present invention, the invention dealing entirely with the combination of independently mounted wheels in such fashion that forward and rear independently mounted wheels are provided upon a vehicle frame all of which may partake of motion in horizontal planes. In this connection, it is necessary, of course, that the forward wheels be mounted for steering and provided with a suitable mechanism for effecting such operation.

An object of the invention, accordingly, is to provide a motor vehicle having forward and rear independently mounted wheels, all of such wheels being mounted to partake of motion in horizontal planes, means being provided for steering the forward wheels and further means being provided for causing the rear independently mounted wheels to move simultaneously in horizontal planes.

Further objects, not specifically enumerated above, will be apparent as the invention is described in greater detail in connection with the accompanying drawings, wherein:

Figure 1 is a plan view showing a vehicle chassis constructed in accordance with the present invention.

Figure 2 is a view in rear elevation showing the chassis of Figure 1.

Figure 3 is an enlarged detail view, partly broken away and in section, showing a means for mounting one of the driving wheels upon the vehicle frame.

Figure 4 is a view in section, taken on line 4—4 of Figure 3, and looking in the direction of the arrows.

With reference to the above drawings, a vehicle frame is shown at 10 and is provided with forward wheels 11 and rear wheels 12. The rear wheels have been shown as mounted in two pairs but, if desired, only one pair of rear wheels need be used.

The forward wheels 11 are mounted between forked arms 13 which are secured upon heads 14 which are mounted in trunnions 15 for movement about vertical axes. The inner arms of the forked members 13 are connected by means of drag links 16 to a stationary crank 17 which may be actuated through a suitable steering mechanism indicated at 18. Springs 19 are provided to support the weight of the frame upon the wheels, these elements being in accordance with general practice.

The rear wheels 12 are mounted between spaced arms 20 which receive the weight of the frame through springs 21 in accordance with existing practice. Wheels 12 may be driven by a chain within the arms 20, the chains being driven by sprockets 22 which are driven by jack shafts 23. The arms are mounted upon heads 24 which are journaled about a horizontal axis in a bearing member 25, this bearing member being formed with upper and lower recesses 26 within which blocks of yielding non-metallic material 27 are provided. The bearing members are mounted between plates 28 and relative movement between plates 28 and recess members 25 is resisted by the blocks of yielding non-metallic material 27, the plates 28 being provided with webs 29 while the recesses 26 are provided with webs 30. It will thus be seen that the cooperating webs serve to compress the yielding non-metallic material therebetween to permit, yieldingly motion of the bearing members 25 about the vertical axes.

The inner arms 20 supporting the respective wheels are connected by stabilizing arms 31 which are pivoted at the ends thereof to the adjacent arms 20. In this fashion, wheels 12 and the associated supporting mechanism therefor move simultaneously in horizontal planes.

The foregoing mechanism provides a means for mounting the vehicle frame in such fashion that the center thereof may be shifted with respect to all of the wheels by actuating the steering mechanism 18. In this fashion, the vehicle is adapted to move rapidly sidewise or crab fashion in order that it may readily clear obstacles and move away from curbs. The parking of the vehicle directly against a curb at both fore and aft points thus does not offer a serious problem in getting the vehicle away from the curb when the fore and aft motion of the vehicle is limited by other vehicles parking in front and to the rear thereof.

While the invention has been described with specific reference to the accompanying drawings, it is not to be limited, save as defined in the appended claim.

I claim as my invention:

A vehicle having a plurality of forward individually mounted steering wheels, steering means for the wheels, a plurality of individually mounted rear wheels, means to mount the rear wheels to trail, said means including resilient means to mount the rear wheels for yielding floating movement in horizontal planes means on the mounting means to drive the wheels, and a rigid member connecting the ends of the mounting means to cause simultaneous lateral movement thereof.

EMIL C. FINK.